May 25, 1926.  1,586,439
A. P. BENNINGTON
BLACKBOARD WIPER
Filed May 2, 1925
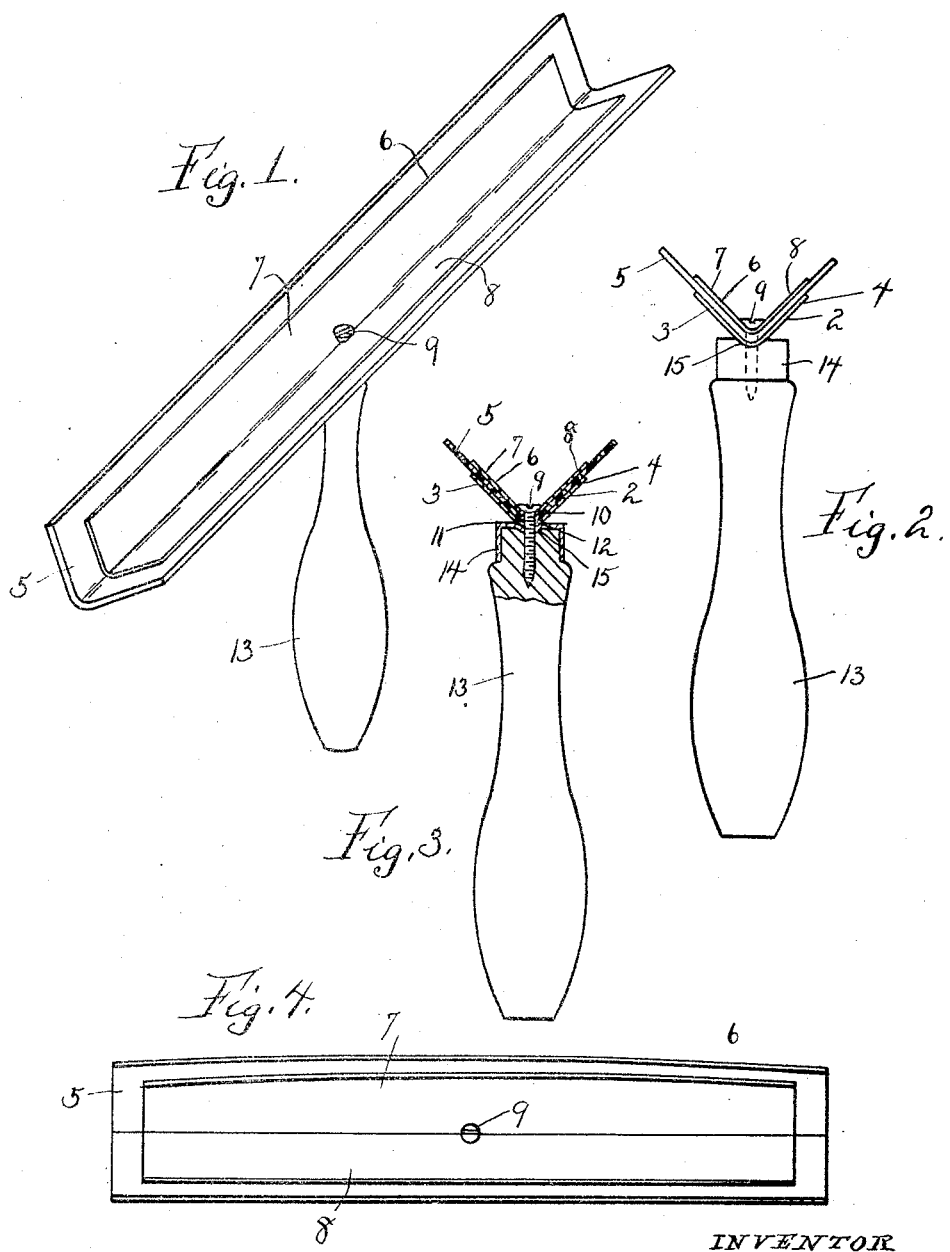
INVENTOR
Albert P. Bennington
By W. W. Williamson Atty.

Patented May 25, 1926.

1,586,439

UNITED STATES PATENT OFFICE.

ALBERT P. BENNINGTON, OF PHILADELPHIA, PENNSYLVANIA.

BLACKBOARD WIPER.

Application filed May 2, 1925. Serial No. 27,347.

My invention relates to new and useful improvements in a blackboard wiper, and has for its primary object to provide an exceedingly simple and effective device of this character which when used for wiping the surface of a blackboard will remove the excess water or other cleaning substance along will all foreign matter.

Another object of the invention is to provide a wiper of this character having two wiping surfaces.

Another object of the invention is to provide a blackboard wiper having two wiping surfaces at right angles to each other.

A further object of the invention is to provide a blackboard wiper having dual wiping surfaces one of said surfaces being concavo-convex longitudinally thereof.

A still further object of my invention is to construct a blackboard wiper comprising two substantially V-shaped plates, a wiping element of flexible material, and a single means to fasten all the parts together.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a perspective view of a blackboard wiper embodying my invention.

Fig. 2, is an end elevation thereof.

Fig. 3, is a vertical section of the same with a portion of the handle left in elevation.

Fig. 4, is a plan view of the wiper showing one wiping element of concavo-convex shape.

In carrying out my invention as herein embodied, 2 represents the body of the wiper which is fashioned from a piece of sheet metal so as to be V-shape in cross section thereby providing two panels 3 and 4 substantially at right angles to each other.

A flexible wiper element 5, usually produced from rubber or other flexible material is set into the trough-like body with all the edges of said wiper element projecting beyond the corresponding edges of the body.

A clamp 6, similar in all details to the body, is also fashioned from a piece of sheet metal so as to be substantially V-shape in cross section and provide two panels 7 and 8 substantially at right angles to each other. The clamp is placed on the wiper element and a screw 9 is passed through the hole 10 in the clamp, a hole 11 in the wiper element, and a hole 12 in the body after which it is screwed into the end of the handle 13, thus the clamp and wiper element into the trough of the body for firmly clamping the wiper element in place and fastening all parts together.

If found desirable one of the panels, as 3, of the body and one of those of the clamp, as 7, may be bowed outwardly longitudinally which will cause one part of the flexible wiper element to assume a concavo-convex shape as shown in Fig. 4. Such a formation makes it possible for the wiping edge or surface to follow any unevenness in a blackboard surface, or in other words, the wiping surface will readily enter the depressions in a blackboard surface and effectually remove moisture or foreign matter that may accumulate therein.

While the body and clamp are of the same size it will be noted that with the wiper element therebetween the longitudinal edges of the clamp will project into closer proximity to the edges of the body thus providing a firm backing for the wiper element while leaving the edges free and flexible.

It is to be particularly noted that the end edges of the wiper element project considerably beyond the ends of the body and clamp so as to make it almost impossible for the metal to touch the surface of the blackboard being cleaned thereby greatly reducing the possibility of damage to said blackboard.

The usual method for cleaning blackboards other than with an eraser, is to scrub the same with a wet rag or the like and then rub it dry with a piece of cloth which leaves the surface gray and streaky. By using a wiper such as herein described the board may be scrubbed with water or other cleaning fluid in the usual manner and the wiper drawn down over the blackboard surface thereby removing the excess fluid and an accumulation of said fluid in front of the wiper will tend to form little streams and carry the foreign matter along with them which is removed by the wiper. As practically all blackboards have uneven surfaces a straight edge wiper will not completely remove the foreign matter and therefore it is advisable to make one wiping surface arcuate or bowed. After the straight edge wiper has been drawn across the surface the hollow surfaces are readily discernible, as they will be moist while the other parts are dry, and as soon as this condition is noticed the wiper is reversed so that the bowed or concavo-convex wiping surface is brought into operative position and by drawing this over the uneven surface it will enter the cavities and clean these portions of the blackboard surface as well as the flat portion is cleaned by the straight edge wiping surface.

A wiper of this character will maintain a blackboard surface in excellent condition and therefore such board will not require renovating for many years.

In order to reduce the possibility of the wiper head turning relative to the handle, the ferrule 14 which snugly fits said handle has a depression 15 formed therein to receive the ridge or corner of the body 2.

Of course I do not wish to be limited to the exact details of construction as herein shown as these may be varied within the limits of the appended claims without departing from the spirit of my invention.

Having thus fully described my invention, what I claim as new and useful is:—

1. A blackboard wiper consisting of a V-shaped body, a V-shaped clamp to set within the body, a flexible wiper element interposed between said body and clamp, a handle, and means passing through the clamp, wiper element and body and into the handle for fastening the parts together.

2. A blackboard wiper consisting of a V-shaped body, a V-shaped clamp to set within the body, a flexible wiper element interposed between said body and clamp and projecting beyond the edges thereof, a handle, a ferrule having a depression and mounted on said handle, said depression receiving the ridge of the body, and a screw for fastening said parts together.

In testimony whereof, I have hereunto affixed my signature.

ALBERT P. BENNINGTON.